United States Patent [19]

Tagawa

[11] Patent Number: 4,874,073
[45] Date of Patent: Oct. 17, 1989

[54] CLUTCH RELEASE BEARING DEVICE
[75] Inventor: Kenichi Tagawa, Fujisawa, Japan
[73] Assignee: Nippon Seiko Kabushiki Kaisha, Tokyo, Japan
[21] Appl. No.: 171,394
[22] Filed: Mar. 21, 1988
[30] Foreign Application Priority Data
  Apr. 2, 1987 [JP] Japan .................... 61-79697
[51] Int. Cl.⁴ .................. F16C 19/00; F16D 23/14
[52] U.S. Cl. .................. 192/98; 192/110 B; 384/612; 384/617; 29/509; 29/526.2
[58] Field of Search .............. 192/98, 110 B; 384/609, 384/612, 617; 29/509, 21.1, 526.2

[56] References Cited
U.S. PATENT DOCUMENTS

| | | | |
|---|---|---|---|
| 3,458,618 | 7/1969 | Burns et al. | 29/509 X |
| 4,306,641 | 12/1981 | Olschewski et al. | 192/98 |
| 4,327,951 | 5/1982 | Arrowsmith et al. | 192/110 B X |
| 4,351,427 | 9/1982 | Miyahara | 192/98 |
| 4,478,325 | 10/1984 | Dagiel | 384/612 X |
| 4,561,788 | 12/1985 | Tanaka | 384/513 |
| 4,611,381 | 9/1986 | LaBarge et al. | 29/509 |
| 4,653,626 | 3/1987 | Limbacher | 192/98 |

FOREIGN PATENT DOCUMENTS

| | | | |
|---|---|---|---|
| 3410116 | 10/1985 | Fed. Rep. of Germany | 192/98 |
| 115130 | 8/1984 | Japan . | |
| 2070182 | 9/1981 | United Kingdom | 192/110 B |

Primary Examiner—Leslie A. Braun
Assistant Examiner—William Gehris
Attorney, Agent, or Firm—Shapiro and Shapiro

[57] ABSTRACT

A clutch release bearing device including a clutch release bearing abutted to a diaphragm spring of a clutch of a vehicle, and a holding arrangement for holding the bearing in a predetermined condition. The holding arrangement includes a sleeve of synthetic resin, a metal anvil extended radially outwardly therefrom to receive an operation force applied by a fork member, and a bearing case for connecting the clutch release bearing to the bearing holding arrangement. The sleeve, the anvil and the bearing case are coupled to each other by punching a portion of the bearing case axially to engage with the periphery of a through hole formed in the anvil and then molding the sleeve to the engaged portions of the anvil and bearing case.

5 Claims, 2 Drawing Sheets

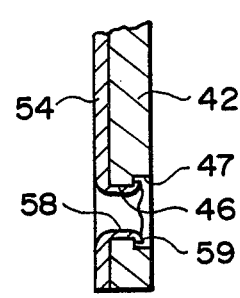
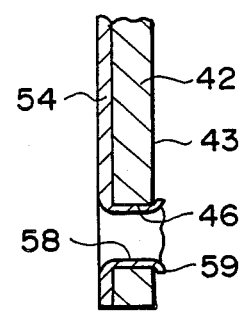
FIG. 3     FIG. 4
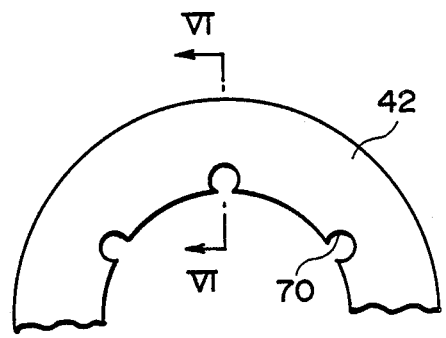
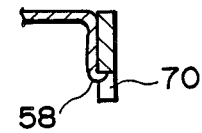
FIG. 5     FIG. 6
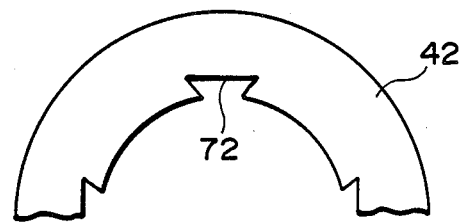
FIG. 7

CLUTCH RELEASE BEARING DEVICE

BACKGROUND OF THE INVENTION

1. Field of the Invention

The present invention relates to a clutch release bearing device used in a clutch of a vehicle, and more particularly to a bearing device having an improved arrangement for holding the clutch release bearing and to an improved method for coupling a bearing case and a sleeve.

2. Related Background Art

A clutch release bearing device usually comprises a clutch release bearing to be abutted against a diaphragm spring, and bearing hold means for holding the clutch release bearing in a predetermined state. The bearing hold means has a sleeve axially movably fitted to a guide shaft, an anvil extending radially outwardly from the sleeve, and a bearing case axially extending from a free end of the anvil. The anvil and the bearing case hold the clutch release bearing.

In one device, the sleeve is made of synthetic resin, and the anvil is made of metal plate and the anvil is made integral with the sleeve by injection molding. The anvil and the bearing case, which is generally cylindrical, are usually coupled together by calking. One end of the cylindrical bearing case is deformed to have a U-shaped section, to which the outer periphery of the anvil is fitted (see, for example, Japanese Laid-open Utility Model Application No. 115130/1984 filed by the assignee of the present invention).

However, since the bearing case and the anvil are calked on the rear outer side of the bearing, a calking area of 2-3 mm is required on the outer periphery of the anvil. Further, the leading edge of the bearing case is folded over the anvil after calking, so that the axial dimension increases by the thickness of the plate, an operating fork may abuts
when the fork is inclined.

SUMMARY OF THE INVENTION

It is an object of the present invention to solve the problems encountered in the related art device and to provide a clutch release bearing device which has no projection or protrusion at the outer periphery or rear surface of the clutch release bearing, so that the anvil and the bearing case can be coupled positively, and in which the anvil and the bearing case thus coupled are secured to a sleeve.

In accordance with the present invention, the anvil and the bearing are not calked on the outer rear surface of the bearing. Rather, a hole is formed on an inner periphery of the anvil, the bearing case is overlapped onto the anvil and the bearing case is punched by using the anvil as a die. Thus, the bearing case is burred (a peripheral wall is formed around the hole), and the resulting peripheral wall is locked by the hole so that the anvil and the bearing case are positively coupled to each other.

The integrated anvil and bearing case are set in a sleeve forming die and the inner peripheries of the bearing case and the anvil are surrounded by synthetic resin forming the sleeve. By filling the synthetic resin into the aforementioned hole, the anvil, the bearing case and the sleeve are integrated and securely coupled.

BRIEF DESCRIPTION OF THE DRAWINGS

FIGS. 3 and 4 shows fragmentary sectional views of other embodiments of the present invention, FIGS. 5 and 7 show fragmentary front views of further embodiments of the present invention, and FIG. 6 is a sectional view taken along a line VI—VI of FIG. 5.

DETAILED DESCRIPTION OF THE PREFERRED EMBODIMENTS

Preferred embodiments of the present invention will be explained hereinafter. These are merely exemplary embodiments and the present invention is of course not limited to the illustrative forms.

Figure 1:
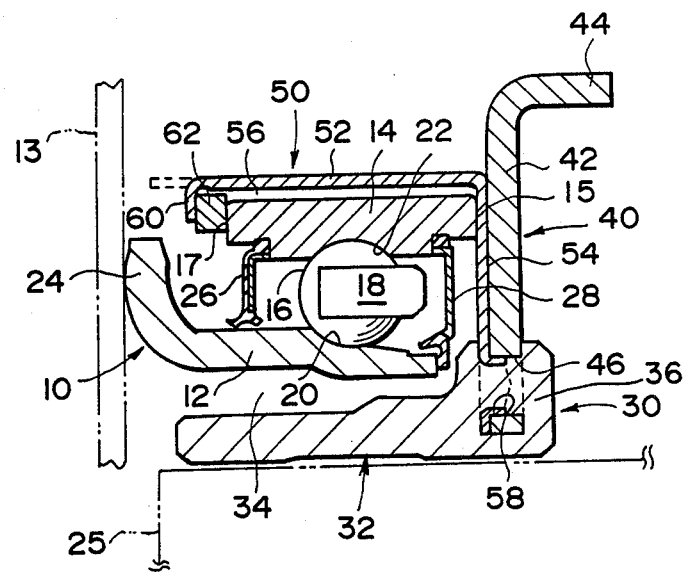
FIG. 1 shows a sectional view of a major portion of one embodiment of the present invention.

In FIG. 1, a clutch release bearing 10 comprises coaxially arranged inner ring 12 and outer ring 14, a plurality of balls 16 disposed therebetween and a retainer 18. The balls 16 roll along ball rolling grooves 20 and 22 formed in the rings circumferentially. An abutment portion 24 which abuts against a diaphragm spring 13 is formed at one edge of the inner ring 12. A pair of seals 26 and 28 are provided between the inner peripheral edges of the outer ring 14 and the corresponding areas on the outer periphery of the inner ring 12.

A bearing hold means 30 comprises of a sleeve 32 made of synthetic resin and fitted onto a guide shaft 25, a metal anvil 40 radially outwardly extending from the sleeve 32, a bearing case 50 integrally coupled to the sleeve 32 and the anvil 40 and holding the bearing 10 for a self-centering function, and a spring 62 for biasing the bearing axially.

Figure 2:
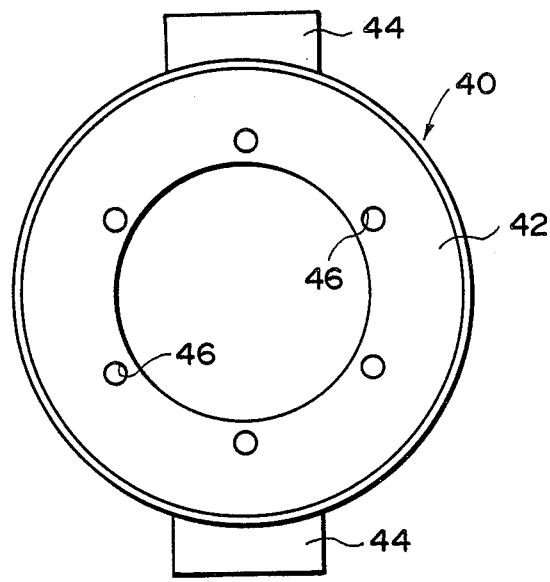
FIG. 2 shows a front view of the same.

The sleeve 32 is of generally cylindrical shape and has an outer diameter smaller than an inner diameter of the inner ring 12, and a radial gap 34 is left therebetween. The sleeve 32 has a thick portion 36 on one end thereof, and the anvil 40 and the bearing case 50 are fixed to the thick portion. As shown in FIGS. 1 and 2, the anvil 40 comprises a hollow disk-shaped body 42 and a pair of folded portions 44 (only one of which is shown in FIG. 1) axially folded. An appropriate number of holes 46 are formed near the inner periphery of the body 42.

The bearing case 50 comprises a cylinder portion 52 and a flange 54 extending radially inwardly therefrom. The inner diameter of the cylinder 52 is selected larger than the outer diameter of the outer ring 14 and a radial gap 56 is left therebetween. The flange 54 is disposed between the end face 15 of the outer ring 14 and the anvil body 42, and an free end thereof extends to the same degree as the body 42 into the sleeve 32.

The bearing case 50 is formed well through noles on the inner periphery of the flange 54 and integrally coupled with the sleeve 32 and the anvil 40 at 58 which engage with the holes 46 of the anvil body 42, that is, with the peripheral walls of the holes. the free end of the bearing case cylinder 52 is radially inwardly bent, and a spring 62 for centering is provided between the bent portion 60 and the outer ring 14.

The anvil body 42 and the bearing case flange 54 are set in overlapped position. the anvil 40 is used as a die so that the annular walls 58 are extruded into and latched to the inner periphery of the holes 46. (The wall 58 extends to a certain intermediate position of the hole 46). The inner periphery of the integrated anvil 40 and bearing case 50, that is, the area in which the holes 46 and the walls 58 are located, is disposed in a die for molding the sleeve 32, and the inner peripheries of the flange 54 and the body 42 are surrounded by synthetic resin. The synthetic resin fills into the holes 46 so that the sleeve 32, the anvil 40 and the bearing case 50 are integrated.

Thereafter, the clutch release bearing 10 is inserted from the open end (left side in FIG. 1) of the integral assembly, and the end surface 15 of the outer ring 14 is abutted against the flange 54 of the bearing case. Then, the spring 62 is abutted against the end surface 17 of the outer ring 14 and the cylinder portion 52 is bent radially inwardly to form portion 60 so that the clutch release bearing 10 is mounted in the bearing hold means 30.

The operation of the present invention will now be explained. When a fork (not shown) abuts against the anvil 40 to apply an axial (leftward in FIG. 1) drive force, the sleeve 32, bearing case 50 and clutch release bearing 10 are integrally moved so that the abutment portion 24 of the inner ring 12 abuts against the diaphragm spring 13 to release the clutch. If there is an eccentricity between the bearing 10 and the diaphragm spring 13, the bearing 10 is radially moved in a plane normal to the axis of the bearing by centripetal force while the bearing 10 is guided by the bearing case flange 54. This movement is allowed by the radial gaps 34 and 56. The bearing 10, once moved to the center position, is held there by the biasing force of the spring 62.

The anvil 40 may be latched to the bearing case 50 by forming a step portion 47 in the hole 46, as shown in FIG. 3, so that an end 59 of the wall 58 of the flange 54 engages with the step 47. Alternatively, the end 59 of the wall 58 may to pass through the hole 46 to engage with the opposite side 43 of flange 54, as shown in FIG. 4. The point to which depends on the size of the hole and the thickness of the anvil body.

The hole formed in the anvil 42 may be a partially open hole 70, as shown in FIG. 5 (in this case, the wall 58 of the bearing case 50 engages with the inner periphery of the hole 70), or a dove tail notch 72, as shown in FIG. 7.

The clutch release bearing 10 need not be adjustable for centering in practice. In this case, the spring 62 is not necessary.

In accordance with the present invention, the anvil and the bearing case can be joined by punching the case while using the anvil as a lower die. Accordingly, those elements can be easily coupled, the coupling equipment is simplified ad the manufacturing cost is reduced.

Since no projection or protrusions is formed on the rear outer periphery of the bearing where the anvil and the bearing case are coupled, the axial and radial dimensions of the device are reduced and the earlier described with the fork is prevented. This allows the selection of the maximum possible size of the bearing for a given space and improves the durability of the bearing.

By mounting the anvil and the bearing case, coupled by punching, on the sleeve molding die and then surrounding the inner periphery of the anvil and the bearing case, with synthetic resin such that the resin fills the holes of the anvil, the anvil and the bearing case are easily integrated with the sleeve and all three elements are easily coupled with a high coupling strength.

I claim:

1. A clutch release bearing device, comprising a clutch release bearing to be abutted against a diaphragm spring for a vehicle clutch, and bearing holding means, said bearing holding means including a synthetic resin sleeve fitted on a fixed guide, a hollow-disk shaped anvil extending radially outward from said sleeve for receiving a drive force from a fork and having a plurality of holes formed circumferentially along an inner periphery thereof, and a bearing case extending from said anvil and holding said clutch release bearing, said bearing case having a flange juxtaposed to said anvil and having an inner periphery provided with through-holes having circumferential walls protruding into the holes of said anvil and coupling said bearing case to said anvil by engagement with the peripheries of said holes of said anvil, the inner peripheries of said flange and said anvil being disposed within the resin of said sleeve with the resin of said sleeve filled in said holes of said anvil such that said sleeve, said bearing case, and said anvil are integrally coupled with one another.

2. A clutch release bearing device according to claim 1, wherein axial ends of said circumferential walls of the through holes of said bearing case extend axially to about midway through the holes of said anvil.

3. A clutch release bearing device according to claim 1, wherein axial ends of said circumferential walls of the through holes of said bearing case engage with rear edges of said holes of said anvil.

4. A clutch release bearing device according to claim 3, wherein said rear edges of said holes of said anvil are stepped.

5. A method of assembling a clutch release bearing device comprising a clutch release bearing to be abutted against a diaphragm spring for a vehicle clutch, and bearing holding means including a synthetic resin sleeve fitted on a fixed guide, a hollow-disk shaped anvil extending radially outwardly from the sleeve for receiving a drive force from a fork, and a bearing case having a flange coupled to the sleeve and a portion extending from the anvil for holding said clutch release bearing, said method comprising the steps of:

forming a plurality of holes circumferentially along an inner periphery of said anvil, coupling said bearing case with said anvil by using said anvil as a die and extruding inner peripheral portions of said flange into said holes of said anvil such that the extruded portions engage the peripheries of said holes of said anvil, and coupling said bearing case and said anvil integrally with said sleeve by molding said sleeve to said anvil and said bearing case such that the synthetic resin of said sleeve surrounds the inner peripheries of said bearing case and said anvil and fills in said holes of said anvil.

* * * * *